350-404 SR

OR 3,630,598

United States

[11] 3,630,598

| [72] | Inventor | William S. Litue, Jr. Rochester, N.Y. |
|---|---|---|
| [21] | Appl. No. | 332 |
| [22] | Filed | Jan. 2, 1970 |
| [45] | Patented | Dec. 28, 1971 |
| [73] | Assignee | Xerox Corporation Rochester, N.Y. |

[54] OPTICAL DEMODULATION FILTER
9 Claims, 5 Drawing Figs.

[52] U.S. Cl. ......................................... 350/157, 350/147, 350/162 SF
[51] Int. Cl. ......................................... G02f 2/00
[50] Field of Search ........................................ 350/147, 157, 162 SF

[56] References Cited
UNITED STATES PATENTS

| 3,335,413 | 8/1967 | Glenn, Jr. ..................... | 350/162 SF |
| 3,470,310 | 9/1969 | Shashoua ..................... | 350/162 SF |
| 3,480,933 | 11/1969 | Treves .......................... | 350/162 SF |

OTHER REFERENCES

Holladay et al., " Phase Control by Polarization in Coherent Spatial Filtering" J.O.S.A., vol. 56, No. 7 (July, 1966) pp. 869-872

............., ............. .. ..nplex Spatial Filters with Polarized Light" J.O.S.A. vol. 59, No. 6 (June, 1969) pp. 748-752

*Primary Examiner*—David Schonberg
*Assistant Examiner*—Paul R. Miller
*Attorneys*—James J. Ralabate, Donald F. Daley and Thomas J. Wall ABSTRACT: Optically screened input information is recorded as excursions on the surface of the thermoplastic film. The excursions consist of a periodic carrier wave and a modulating signal containing the input information. Highly coherent polarized light is directed incident upon the image-bearing surface whereby the light is diffracted by the signal-modulated deformations thereon. The diffracted light is then passed through a projection system including a spatial filter positioned in the focal plane of the system comprising an opaque mask having two clear apertures therein coincident with the two first diffracted order focal spots and being of a size sufficient to pass the modulated sidebands of the input signal. A device for rotating the relative planes of polarizations of the diffracted light is positioned in at least one of the diffracted beams wherein the polarization state of the two diffracted light beams are orthogonal at the scan plane of the system.

PATENTED DEC 28 1971 3,630,598

INVENTOR.
WILLIAM S. LITTLE
BY
ATTORNEY

PATENTED DEC 28 1971

OPTICAL DEMODULATION FILTER

This invention relates to imaging, and in particular, to efficiently converting a phase image into an intensity image.

More specifically, this invention relates to an imaging technique called thermoplastic xerography and which was disclosed by Gundlach and Claus in the Jan.-Feb. 1963 issue of the Journal of Photographic Science and Engineering. As described by Gundlach et al., in thermoplastic xerography a light image of an original to be reproduced is recorded on the surface of a thermoplastic insulating material in the form of the surface wrinkles. As in conventional xerography, the thermoplastic receptor surface is first uniformly charged and the surface then exposed to the light image of the original to selectively dissipate the charge in image configuration. The charge or latent electrostatic image is then developed by heating the thermoplastic to a point wherein the material deforms in response to the image charge. The image formed will either be a "frost" image or a "relief" image depending on the sequence in which the processing steps are performed. In relief imaging, the electrostatic latent image of the original input scene information is applied to the surface of the thermoplastic receptor while the receptor material is in a hardened state. When the material is heated to or slightly past the threshold temperature, the surface deforms only in response to a difference in charge density between the imaged and the nonimaged areas. On the other hand, in frost imaging, the latest electrostatic image is applied to a presoftened receptor surface. In this latter process the deformation pattern of the latent image is superimposed on a vast number of minute, randomly scattered, noise depressions such that the random noise is, in effect, modulated by the signal information.

The frost process, because of its unique image characteristic, is found to be responsive to low-frequency inputs and is capable of recording continuous and half-toned images.

It was later found that by optically screening the original input scene information, a phase image could be formed on the surface of a thermoplastic film containing both a periodic, i.e. sinusoidal, carrier wave and a modulating input signal. The repetition frequency of the periodic carrier wave could thus be matched to the hydrodynamic resonant range of the thermoplastic film by employing proper screening techniques producing a dramatic improvement in the frequency response characteristics of both the frost and relief imaging processes. For further information and features concerning optical screening of a phase object, reference is had to the Urbach disclosure in the Spet.-Oct. 1966 issue of the Journal of Photographic Science and Engineering, as well as his U.S. Pat. No. 3,436,216.

All forms of thermoplastic xerography are characterized by the recording of an original in the form of a phase image. By definition, a phase image is one that does not absorb light but only redirects it by either diffraction of refraction. Since the eye and most other optical detecting devices respond only to the intensity of the image observed, it is generally necessary to view a phase image by special optical means. For example, by directing collimated light incident upon a screened phase object, similar to that disclosed by Urbach, the plane light wave front is converted to a periodic wave front by the screen grating and the periodic wave front amplitude modulated by the original input information. Just as in the field of carrier communications, this amplitude-modulated phase carrier may be demodulated in some manner and the original input scene recovered.

A theoretical treatment of the use of amplitude-modulated phase carriers in thermoplastic xerography is given by Suzuki et al., in the July 1964 issue of Applied Optics. Suzuki suggests passing the amplitude-modulated phase carrier through a projection lens and then demodulating the signal by means of a spatial filter positioned in the back focal plane of the lens. The Suzuki filter simply consists of an opaque mask having one clear aperture therein which is tuned to the first order spectrum of the screened frequency and which substantially blocks all other spectrums. Although the Suzuki filter is relatively simple to construct, it nevertheless must be extremely inefficient in that relatively little energy is passed through the filter in relation to the total input to the system and, therefore, the intensity of the recovered image is weak.

It is therefore an object of this invention to improve method and apparatus for recovering a phase image.

A further object of this invention is to improve the efficiency of an image recovery system for use in thermoplastic xerography.

A still further object of this invention is to increase the intensity of an image recovered from a phase object upon which the image is recorded in the form of surface deformations thereon.

These and other objects of the present invention are attained by means of a spatial filter positionable in the focal plane of readout system illuminating with polarized light a phase image recorded as a signal-modulated periodic carrier wave on the surface of a phase object, the filter comprising an opaque mask having two clear apertures therein with each aperture centerable about a diffracted order associated with the periodic carrier frequency and at least one of said apertures having operatively associated therewith means for rotating the plane of polarization of the light passing therethrough so that the two diffracted light beams are orthogonal at the scan plane of the system.

For a better understanding of the invention as well as other objects and further features thereof reference is had to the following detailed description of the invention to be read in connection with the accompanying drawings wherein.

In thermoplastic xerography, a heat-deformable plastic insulating material is first uniformly charged and then imaged by selectively exposing the charged surface in a manner similar to that employed in conventional xerography. In general, it is preferred that the thermoplastic material be made of a photoconductive material whereby the latent electrostatic image can be formed by simply exposing the charged surface to a light image of the original. Making the thermoplastic photoconductive can be accomplished by dispensing or copolymerizing a photoconductive material with a deformable thermoplastic resin. Another common practice is to blend the plastic polymer with a complexing phenolformaldehyde with 2, 4, 7-trinitrofluorenone or any other suitable Lewis acid. For further information concerning suitable plastic materials and methods for formulating photoconductive blends thereof, reference is had to the previously noted Urbach patent. In order to prevent gross distortion of the thermoplastic material during image development, it may also be desirable to coat the thermoplastic material upon a relatively rigid conductive substrate. Suitable conductive substrate materials include flexible metal foil belts made of aluminum, brass, copper or the like. Heat-resistant polymers such as polycarbonates and polyurethanes can be similarly employed when the polymers are coated with a thin transparent conductive layer such as tin oxide or the like.

It should be quite clear from the disclosure below, however, that the present invention can also be practiced in conjunction with the use of a nonphotoconductive insulating material when a selective charge pattern is achieved by means of electron beam recording, electrical discharge recording charge transfer or the like. Similarly, a single component layer of thermoplastic insulating material may be used when the thermoplastic is laminated or held in contact with a photoconductive substrate in a known manner such that the photoconductive material is used to control the amount of charge deposited on the thermoplastic surface.

Figure 2:
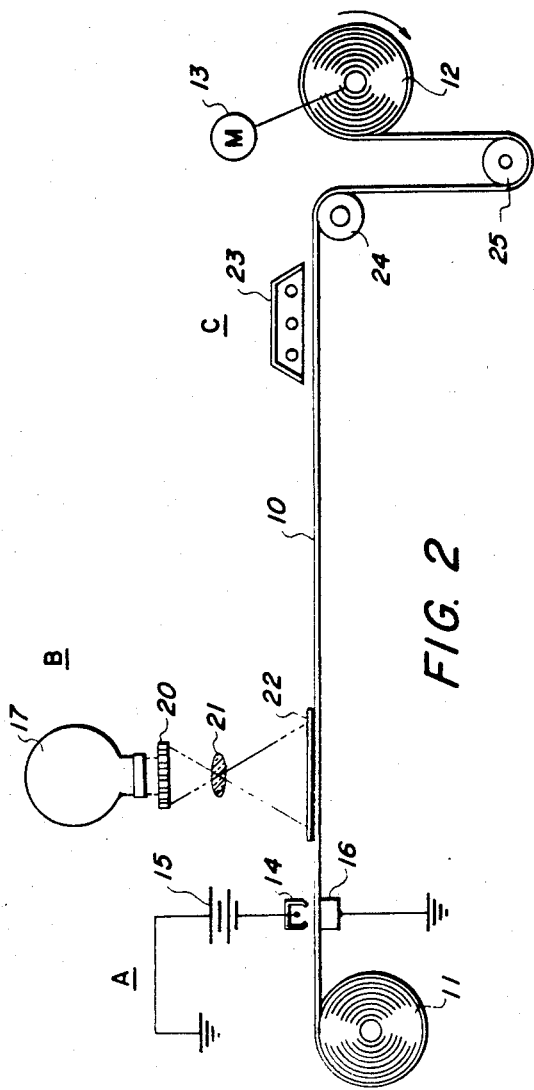
FIG. 2 is a side view of an exemplary apparatus for preparing a thermoplastic receptor adapted for use in the image recovery system shown in FIG. 1.

Apparatus for processing a thermoplastic material to formulate a phase image is illustrated in FIG. 2. A photoconductive thermoplastic insulating web 10 is stored on a supply pool 11 and the web operatively connected to a takeup spool 12. The web is arranged to move over a predetermined path of travel through the various processing stations as the takeup spool is driven in the direction indicated be means of a motor 13.

The first processing station in the direction of web travel is a charging station A, wherein a charge is applied to the top surface of the thermoplastic receptor. A corona-generating device 14, connected to a suitable source of power 15 is positioned in close proximity to the receptor surface and extends horizontally across the web surface to uniformly charge the entire surface of the thermoplastic material as the web is drawn over a grounded electrode 16.

The next subsequent processing station in the direction of web travel is an exposure station B, in which is located an actinic light source projector 17. The projector is arranged to project a light image of an original input scene 20 through a lens 21. However, before the light image of the original can selectively dissipate the charge found on the web surface, the projected light passes through an optical screen grating 22 mounted adjacent to and in close parallel relation with the top surface of the web. Although any suitable optical screening device may be employed, it is preferred that the screen have opaque areas thereon having a repetition frequency such that the projected screen image creates an electrostatic pattern on the thermoplastic web surface having a frequency in the hydrodynamic resonant range of the plastic material. In practice, the frequency of the screen occurrence should be approximately in a range of about 1.5 to about 2.7 times the thickness of the thermoplastic film. When the thickness of the film is less than 2 microns, the frequency of occurrence should be preferably about 1.5 to about 5 times the thickness of the film. Simultaneous image exposure and screening, as herein disclosed, is preferred since it is found to produce a greater degree of carrier modulation than a sequential system. However, it should be clear that any method of operation may be employed that will form a pattern in which the resulting surface deformations are composed of a periodic or sinusoidal carrier at approximately the resonant frequency of the thermoplastic material and in which the carrier is amplitude modulated with the input object scene information to be recorded.

Once the screened charge pattern is formed on the photoconductive web, the web is drawn beneath an electrical resistant heater 23 adapted to soften the thermoplastic material to a threshold condition wherein the charge fields associated with the latent image cause the material to deform in response to the image pattern. The deformed web is then passed over a series of guide rollers 24 and 25 arranged to form a cooling loop of sufficient length whereby the thermoplastic material is allowed to return to a hardened state. The rehardened thermoplastic web is then stored on the takeup spool 12 until such time as a readout of the recorded information is desired.

Figure 1:
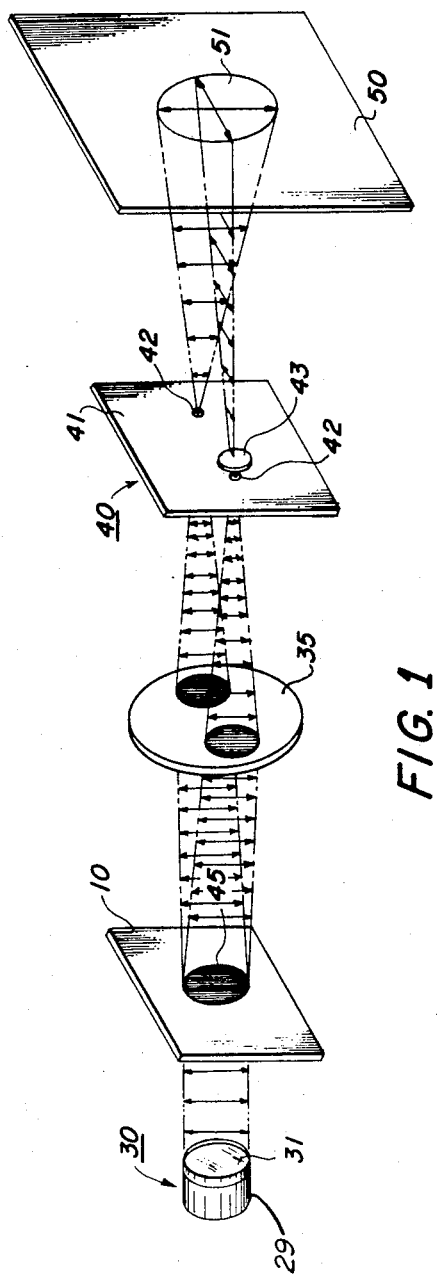
FIG. 1 is a perspective view of a readout system for recovering a phase image recorded as deformations on the surface of a thermoplastic receptor in accordance with the present invention.

A readout system embodying the techniques of the present invention capable of recovering the input information stored on the deformed phase object is shown in FIG. 1. The imaged thermoplastic material 10 is first securely mounted in an image plane directly in front of the light source 30. The light source basically comprises a housing 29 containing a highly coherent source of polarized light such as a laser (not shown) which is arranged to direct light through a collimating lens 31 onto the back surface of the phase object. The plane wave front of light passes through the imaged phase object substantially normal to the image plane and the light is diffracted by the signal-modulated surface deformations thereon. The system is arranged so the diffracted light next passes through a projection lens 35 resulting in the spatial spectrum of the recorded surface deformations being displayed in the back focal plane of the lens. For example, if the image modulation corresponds to an input object scene of uniform background, the sinusoidal carrier of constant amplitude will be displayed. More generally, however, the modulating signal will produce a change in amplitude of the carrier wave in accordance with the variations in the optical density of the original input scene so that some signal information will be present in the spatial spectrum.

As suggested by Suzuki in the above-noted disclosure, a spatial filter positionable in the focal plane of a lens can be employed to demodulate the original input signal. The Suzuki-type filter consists of an opaque mask having a single clear aperture therein which is tuned to pass the first diffracted order associated with the screen frequency and which blocks all other frequencies. However, as noted, the Suzuki device is relatively inefficient in that a great deal of the total input energy from the light source is blocked by the filter. It follows, therefore, that the intensity of the image recovered by this type of filtering device must also be relatively weak.

A spatial filter 40 is shown in FIG. 1 positioned at about the back focal plane of lens 35. The filter basically is composed of a thin opaque mask 41 having two clear apertures 42 formed therein. The mask is positioned in the readout system so the center of the two apertures lies upon a common line passing through the optical axis of the system and with the line being substantially perpendicular to the direction of extension of the phase object carrier deformations 45. The individual apertures are each centered about a diffracted order associated with the screen or carrier frequency and are of a size sufficient to pass the modulated sidebands of the original input scene information carried by these diffracted orders. Although any diffracted order may be employed in the practice of the present invention, it is preferred that the two first diffracted orders be used. It should be clear, however, that some diffracted order higher than the first diffracted order can be employed without departing from the teachings of the present invention.

A phase plate 43 is shown in FIG. 1 positioned in the optical path of one of the diffracted orders and located in close proximity to the opaque mask. The term phase plate, as herein used, is not restrictive and the term is broad enough to include any device capable of rotating the polarization plane of a beam of light of the type herein utilized. The phase plate can take the form of a "half wave plate" consisting of thin slabs of doubly refractive material such as calcite, quartz, mica or the like that are specially prepared so that their principal axes are oriented at some angle with respect to the plane of polarization in a way that produces a rotation in the orientation of the polarized light passing therethrough. Phase plate 43 can also be fabricated of materials exhibiting so called "optical activity," that is, materials capable of rotating the plane of polarization of light passing therethrough by virtue of a twisted molecular structure. Examples of some optically active materials are sugar, sugar solution, quartz, sodium chlorate or any other such material which is capable of producing rotation of light passing therethrough as a function of the material thickness. Furthermore this term is also broad enough to include known prism and mirror systems used in the art to rotate the polarization of the light.

Referring once again to FIG. 1, the light beams associated with the two first diffracted orders are projected through the filter 40 onto a scan plane 50 by the projection lens 35. The polarization state of each of the light beams is illustrated schematically by a series of arrows with the beam traces being slightly exaggerated in the figure in order to more clearly define the function of the apparatus. As can be seen, the polarized light passing through the deformed phase object 10 is diffracted by the screen grating 45, however, the polarization state of the diffracted beams remains unchanged from that emitted by the light source 30. Similarly, the polarization state of the diffracted light will remain unchanged as it moves through phase plate 43 which is adjusted to introduce a 90° phase change in the polarization state of one of the diffracted light beams.

Ordinarily, when light is passed through a mask having two clear apertures therein, two distinct wave fronts of light are formed which become superimposed at a viewing plane. Evenly spaced light and dark bands or fringes are thus formed because of the interference between the two superimposed light waves. (This phenomenon was originally noted by Young and is more thoroughly described in Jenkins and White, Fundamentals of Optics, third edition, page 234). Similarly, if the filter of the present invention were simply comprised of a mask having two clear apertures tuned to the first diffracted orders associated with the screen grating frequency, the output at the scan plane would be a visual representation of a series of light and dark fringe areas.

Figure 5:
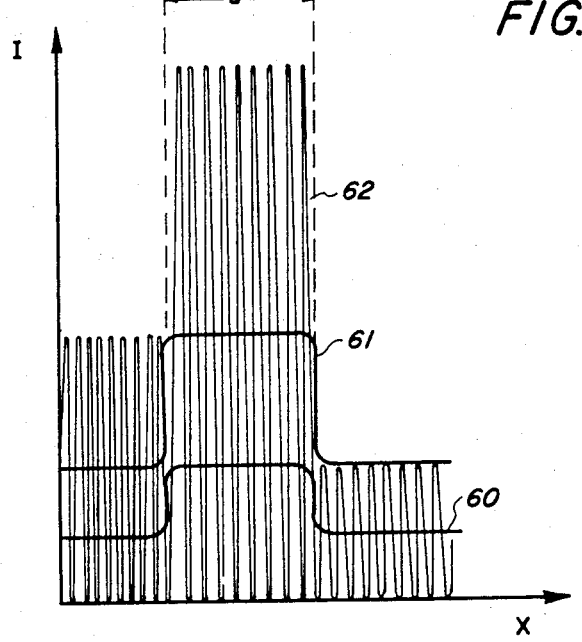
FIG. 5 is a graphical representation in which the intensity of the final image recovered is plotted against the position of the image in a predetermined plane.

For example, a phase object 10 is shown in FIG. 5 having a carrier wave 45 which is amplitude modulated by a signal 48. The signal is of a theoretical width $d$ and is shown greatly magnified and distorted for explanatory reasons. Positioned directly underneath phase object 10 is a graphic representation of a number of scan images obtained by using the readout system herein described in conjunction with different filter arrangements. In the graph, the image intensity (I) is plotted against the position of the image in the ($x$) plane. The output scan image depicted by plot 62 represents the output of the system when a filter having two clear apertures tuned to the first diffracted order is employed. It should be noted that although the intensity of the output signal is relatively high, the information contained thereon is not clearly discernible because it is inextricable from the light and dark fringe areas.

For comparative purposes, the output scan image obtained from the identical original input scene is shown for a single aperture mask similar to the one described by Suzuki et al. The image plot is shown superimposed over the double apertures mask output in FIG. 5 and is numerically referred to as 60. A comparison of these two outputs shows that the single-aperture-type filter will demodulate the input signal from the periodic carrier wave and the visually distracting interference fringes associated with the double aperture filter are eliminated. However, it should also be noted that the intensity of the output image obtained by using the single aperture filter is relatively low when compared to that obtained by using the double aperture filter.

A third scan output signal 61 is also superimposed upon the graph in FIG. 5 and depicts the output obtained when the filter of the present invention is employed in the readout system. Output signal 61 is composed of the two superimposed light beams of the first diffracted orders whose amplitude is a spatially modulated function of the input scene information. By rotating the polarization state of one of the diffracted light beams as described above, such that the polarization states of the two beams are orthogonal in the scan plane, the filter functions to eliminate the extraneous high-frequency interference pattern which generally occurs at the scan plane when two coherent beams of light are superimposed thereon. Therefore, by making the two first diffracted order beams take on orthogonal polarization states at the scanning plane, the visual sinusoidal intensity variations arising from the interference are avoided. The filter, therefore, produces an intensity pattern at the scanning plane which is double the first order beam intensity while at the same time eliminating the "carrier"-type dark and light fringes inherently associated with a double-aperture-type filtering device. As can be seen from a comparison of the three superimposed output signals in FIG. 5, the overall output of the system of the present invention is twice as efficient as a similar system utilizing only a single aperture mask and is free from any distracting interference patterns normally associated with a double aperture mask.

Figure 3:
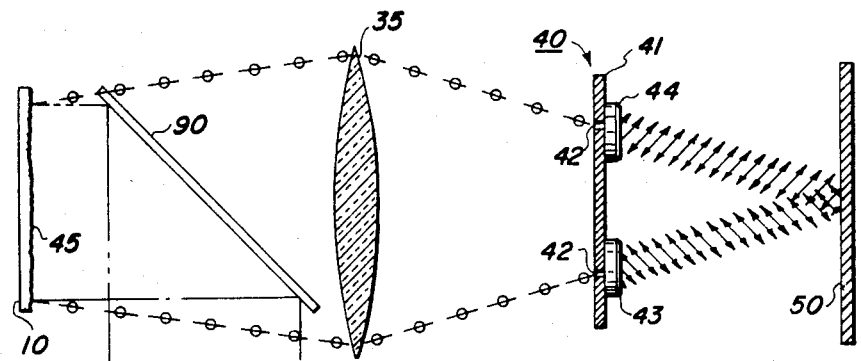
FIG. 3 is a top plane view showing a second means of recovering a phase image embodying the teachings of the present invention.
Figure 4:
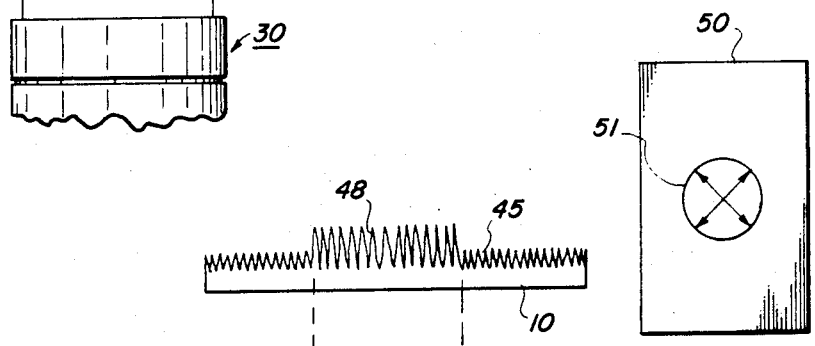
FIG. 4 is an end view illustrating the polarization states of the two diffracted light beams presented in the scan plane of the apparatus shown in FIG. 3.

FIGS. 3 and 4 represent another arrangement for recovering a phase image embodying the teachings of the present invention. A source of collimated polarized light 30, as described above, is located at some position off axis in relation to the optical centerline of the readout system. The light from the source is directed incident upon a beam splitter 90 where it is redirected normal to the deformed surface of the thermoplastic receptor 10. The light is diffracted by the signal-modulated sinusoidal surface deformations and is reflected back towards the projection lens 35. Although a beam splitter is employed in this embodiment, it is quite feasible to use a mirror in its stead if the mirror is of a size sufficiently small to allow the reflected diffracted light waves to pass therebeyond in an uninterrupted fashion towards the projection lens. The diffracted light beams entering the projection lens are projected to a spot or point in the focal plane of the lens. A spatial filter tuned to the first diffracted orders associated with the sinusoidal screen frequency is positioned at or about the focal plane of the readout system which permits the sideband signal associated with the first diffracted orders to pass to scan plane 50 in a manner as described above.

In this second embodiment, two individual phase plates or rotators 43 and 44 are employed with each rotator being positioned in the optical path of a diffracted order passing through the mask apertures. Here, the arrows represent the plane of polarization by indicating the orientation of the "electrical vector" of the electromagnetic radiation with the dots indicating that the plane of the polarization is perpendicular to the plane in which the system is viewed. In this embodiment, the two phase plates or rotators are matched so that each is adapted to rotate the plane of polarization of the light passing therethrough 45° in a direction opposite to the other resulting in the superimposed light beams having orthogonal polarization planes orientated as shown in FIG. 4.

While this invention has been described with reference to these structures disclosed herein, it is not confined to the details as specifically set forth. As for example, the plane rotators or phase plates need not be located adjacent to the mask and can be, in fact, located at any point in the readout system along the optical path associated with the diffracted beams between the imaged planes, that is, the plane of the receptor, and the scan plane. Furthermore, it may be desirous to position a half wave phase plate or plane rotator in one of the optical paths of the diffracted beams while positioning a dummy lens in the other capable of retarding the light passing therethrough an amount equal to that retarded by the true rotator but which leaves the polarization state of the light beam unchanged. It should be clear therefore that this application is intended to cover such modifications or changes as may come within the purposes of the improvements or the scope of the following claims.

What is claimed is:

1. A spatial filter positionable in the focal plane of an optical readout system in which a phase object is illuminated by coherent polarized light, said phase object having surface deformations thereon being composed of a periodic carrier wave and an amplitude-modulating signal containing input information, the filter comprising an opaque mask having two clear apertures therein each of which is centerable about a diffracted order associated with the carrier wave frequency and being of a size sufficient to pass the diffracted order spectrum and having associated therewith means for rotating the plane of polarization of the light passing through the filter whereby the polarization planes of the two diffracted light beams are orthogonal in the scan plane of the system.

2. The filter of claim 1 wherein the two apertures are centered about the two first diffracted orders associated with the carrier wave frequency.

3. The apparatus of claim 2 wherein said means to rotate the plane of polarization of the light passing through said filter comprises a half wave plate position in one of said apertures.

4. The apparatus of claim 3 further including light-transparent means associated with the other of said apertures and being capable of retarding the light passing through said other aperture in an amount equal to the retardation of said half wave plate.

5. The apparatus of claim 1 wherein the means to rotate the plane of polarization of the light passing through the filter rotates the plane of polarization of the light passing through one of said apertures 90° in relation to the plane of polarization of the light passing through said other aperture.

6. The apparatus of claim 5 wherein said means to rotate the plane of polarization 90° comprises an optically active material positioned in the optical path of one of the diffracted light beams.

7. Apparatus for recovering input information recorded as surface deformations on a phase object, the phase object being composed of a periodic carrier wave and an amplitude-modulating signal containing the input information including
means to support the phase object in a plane with the deformed surface substantially normal to said plane,
means to direct a plane wave front of polarized light substantially normal to and incident upon the deformed surface of said object whereby the light is diffracted by the periodic carrier wave,
a lens positioned to focus the diffracted light at points in the back focal plane of said lens,
a spatial filter positionable at about the back focal plane of said lens for passing the light associated with the two diffracted orders associated with the carrier wave frequency, and
means to change the polarization states of the two diffracted orders in relation to each other wherein the two diffracted light beams passed by said filter are orthogonal in the image plane of the lens.

8. The apparatus of claim 7 wherein said means to change the polarization state of the diffracted light includes means positioned in the optical path of one of said diffracted orders for rotating the plane of polarization of the light associated with said one diffracted order about 90° in relation to said other diffracted order.

9. The apparatus of claim 7 wherein means to change the polarization state of said diffracted light includes means positioned in the optical paths of each of the two diffracted orders for rotating the polarization planes of each of the diffracted beams wherein two beams are orthogonal at the image plane of said lens.

* * * * *